May 29, 1934.　　　　　S. O. CLAYTOR　　　　　1,960,230

POWDER MIXER

Filed July 24, 1933

INVENTOR
SPRY O. CLAYTOR
BY
*Harold Todd*
ATTORNEY

Patented May 29, 1934

1,960,230

UNITED STATES PATENT OFFICE 1,960,230

POWDER MIXER

Spry O. Claytor, United States Navy

Application July 24, 1933, Serial No. 682,039

9 Claims. (Cl. 221—65)

(Granted under the act of March 3, 1883, as amended April 30, 1928; 370 O. G. 757)

This invention relates to a tooth powder mixer, and has for an object to provide an improved tooth powder mixer or tray having means to facilitate the placing of tooth powder on the bristles of a tooth brush.

Another object of this invention is to provide a mixer or tray especially adapted to receive tooth powder and to serve for positively causing the tooth powder to adhere to the bristles of the tooth brush.

A further object of this invention is to provide a tooth powder mixer or tray that may serve as a cork or stopper for a tooth powder bottle or container and which may be used independently of the bottle or container.

A further object is to provide means on a tooth powder mixer or tray that will cause the tooth powder placed thereon to be positively inserted between the bristles of the tufts as well as between the tufts of a tooth brush.

A further object of this invention is to provide a means on a tooth powder tray or mixer that will cause the tooth powder to be positively picked up by the bristles of a tooth brush, which means may be in any desired form or shape and which may take the form or shape of a trade mark or trade name projecting above the inner surface of the mixer or tray so that the same means will additionally serve as an advertisement or indentification of the tooth powder that is being dispensed.

A still further object of this invention is to provide such improvement to the patent to Nesbitt No. 261,949 as will cause the structure of this patent to become practical and operative.

With the above and other objects in view, this invention consists in the construction, combination and arrangement of parts as will be described more fully hereinafter.

Reference is to be had to the accompanying drawing, in which.

Figure 3:
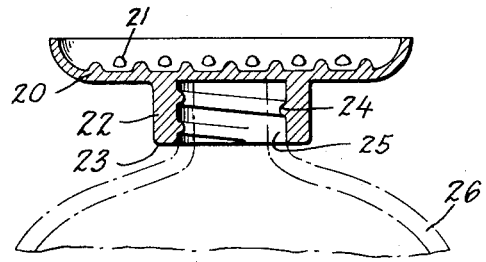
Fig 3 is a sectional view of another form of this tooth powder tray or mixer provided with a threaded stopper and alternately securing the same to the top of a tooth powder bottle.

There is shown at 10 one form of the tray or mixer constituting this invention. As is well known, the common method of making use of tooth powder at the present time is by attempting to pour some tooth powder onto the preferably moistened bristles of the tooth brush, or into the palm of the hand and then attempting to place the powder on the brush. With the first mentioned method there is generally a great deal of powder wasted, which does not fall on nor be caught by the bristles of the brush. In the second manner, a messy job is performed and further, the powder is no longer sanitary due to its contact with the human hand.

Another possible solution of the problem was to pour the powder on a flat surface, such as a saucer, and attempt to cause the powder grains to adhere to the brush by pressing the tooth brush thereon. The before-mentioned patent attempted to solve the problem in this last manner, but this manner is defective in that the bristles will merely push the powder away along the smooth surface of the tray or saucer without causing any adherence therebetween. All of these problems are overcome, however, in applicant's invention, wherein the tray or mixer 10 is formed in the shape of an oblong trough 11, having a depth slightly greater than the length of the bristles 12 of a conventional tooth brush 13. This trough 11 is provided with a plurality of protuberances projecting from the inner surface thereof, these protuberances being in any desired form. In the present form of the invention the protuberances are in the form of a trade-mark or trade name 14 made as a relief printing projecting from the inner surface of trough 11.

The bottom of trough 11 is affixed to or integral with a supporting base 15, the base 15 having a flat bottom surface 16 so that it may rest on a table or other flat supporting surface. The sides 17 of base 15 are preferably rounded and, if desired, may be used as a stopper for a bottle according to the forms shown in Figs. 3 and 4.

In Fig. 3, the tray or mixer 20 is provided with protuberances in the form of knobs 21, while the support or base 22 is provided with a flat bottom surface 23 so that it may rest on a flat table or support, and is further provided with a threaded aperture 24 that may cooperate with the threaded neck 25 of a bottle or container 26 for tooth powder.

Figure 4:
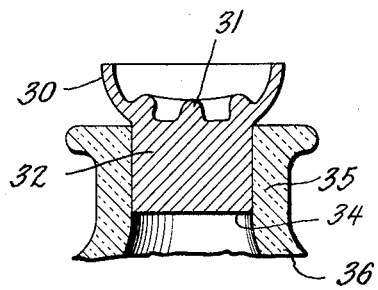
Fig. 4 is a sectional view of another form of tray or mixer combined with an insert stopper for a tooth powder bottle.

In the form of the invention shown in Fig. 4, the tray or mixer 30 is provided with protuberances in the form of a grid 31 and has a supporting base 32 provided with a flat bottom 34 capable of resting on a flat table or support.

The sides of base 32 are rounded to cooperate with and act as a stopper for the neck 35 of a tooth powder bottle or container 36.

Figure 2:
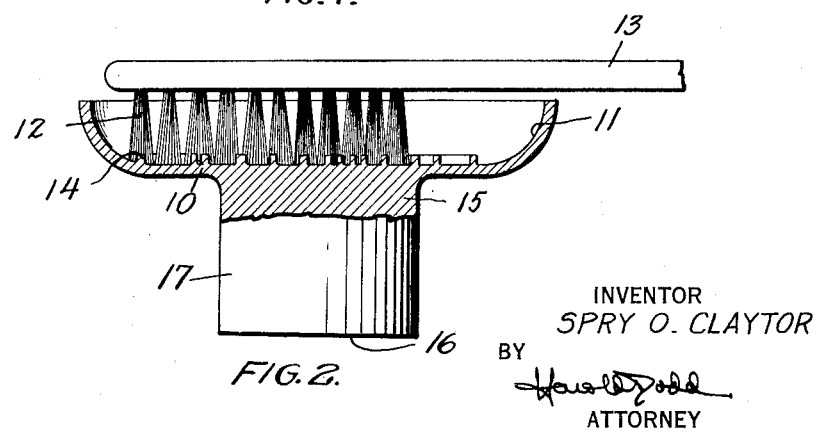
Fig. 2 is a sectional view on lines 2—2 of Fig. 1 showing the tooth brush in operative position thereon.

In operation, the mixer or tray 10, 20, or 30 may be included in the package that is being sold containing the tooth powder in the bottle or container 26 or 36. The tooth powder is poured from the container into the tray 10, 20, or 30 and then the moistened tooth brush 13 is placed with the bristles 12 into the tray 10, 20, or 30. As will be observed from Fig. 2, the protuberances 14 serve to separate the bristles of the various tufts from each other as the brush is pressed downwardly thereover and thus serve to cause the grains of tooth powder to become distributed therebetween, the moisture in the bristles serving to cause the tooth powder grains to adhere thereto and therebetween. The bristles 12 of brush 13 will thus become quickly and easily saturated with the tooth powder grains, eliminating the messiness of attempting to do this with the palm of the hand or the waste of attempting to pour the powder grains onto the bristles.

Although the protuberances 14 have been shown in the form of a trade name or trademark, or in the form of knobs or a grid, it will be apparent that the protuberances may take any desired form or shape, the important feature thereof being that they should project above the inner surface of the trough 11 so as to separate the bristles of the tooth brush as they are pressed thereover, and enable the bristles to grasp and pick up the grains of tooth powder.

Figure 1:
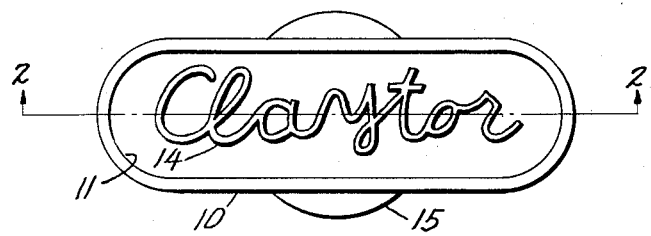
Fig. 1 is an elevational plan view of a preferred form of the tooth powder tray or mixer constituting this invention.

When made in the form shown in Fig. 1, however, the protuberances 14 serve the additional purpose of identifying or advertising the name or trade-mark of the tooth powder manufacturer, it being contemplated that the mixer or tray constituting this invention might be distributed either separately or together with a bottle or container for tooth powder, either at a small cost or as a gratuity for advertising purposes.

It will be understood that the above description and accompanying drawing comprehend only the general and preferred embodiment of this invention, and that various changes in construction, proportion and arrangement may be made within the scope of the appended claims without sacrificing any of the advantages of this invention.

The herein described invention may be manufactured and used by or for the Government of the United States of America for governmental purposes without the payment of any royalties thereon.

I claim:

1. A tooth powder tray or mixer, comprising a trough, said trough being of a size to receive the bristles of a tooth brush, and a plurality of protuberances projecting above the inner surface of said trough.

2. A tooth powder tray or mixer, comprising a trough, said trough being of a size to receive the bristles of a tooth brush, and a plurality of protuberances projecting above the inner surface of said trough, said protuberances being in the form of a trade-mark or trade name printed in relief.

3. A tooth powder tray or mixer comprising a trough, said trough being of a size to receive the bristles of a tooth brush, and a plurality of protuberances projecting above the inner surface of said trough, said protuberances being in the form of a plurality of knobs.

4. A tooth powder tray or mixer comprising a trough, said trough being of a size to receive the bristles of a tooth brush, and a plurality of protuberances projecting above the inner surface of said trough, said protuberances being in the form of a grid.

5. A tooth powder tray or mixer comprising a trough, said trough being of a size to receive the bristles of a tooth brush, and a plurality of protuberances projecting above the inner surface of said trough, and a base for said tray, said base having a flat bottom surface to support the tray on any flat supporting surface.

6. A tooth powder tray or mixer comprising a trough, said trough being of a size to receive the bristles of a tooth brush, and a plurality of protuberances projecting above the inner surface of said trough, and a base for said tray, said base having a flat bottom surface to support the tray on any flat supporting surface, said base being in the form of a bottle stopper.

7. A powder tray or mixer, comprising a trough, said trough being of a size to receive the bristles of a brush, and a plurality of protuberances projecting above the inner surface of said trough.

8. A powder tray for forcing powder into the moistened bristles of a brush, comprising a trough having smoothly sloping sides merging into a bottom surface, and a plurality of protuberances projecting above the inner bottom surface of said trough.

9. A powder tray for forcing powder into the moistened bristles of a brush, comprising a trough having smoothly sloping sides merging into a bottom surface, and a plurality of protuberances projecting above the inner bottom surface of said trough, said protuberances being spaced apart over substantially the entire inner bottom surface.

SPRY O. CLAYTOR.